United States Patent [19]

Souza

[11] 4,045,905

[45] Sept. 6, 1977

[54] ANIMAL TRAP

[75] Inventor: Anthony J. Souza, Lititz, Pa.

[73] Assignee: Woodstream Corporation, Lititz, Pa.

[21] Appl. No.: 629,679

[22] Filed: Nov. 6, 1975

[51] Int. Cl.² .............................................. A01M 23/26
[52] U.S. Cl. .............................................. 43/88; 43/96
[58] Field of Search ................................. 43/81–97, 43/58

[56] References Cited

U.S. PATENT DOCUMENTS

| | | | |
|---|---|---|---|
| 1,546,066 | 7/1925 | Gagne | 43/92 |
| 1,825,193 | 9/1931 | Maddox | 43/90 |
| 2,201,307 | 5/1940 | Culbertson | 43/90 |

Primary Examiner—Robert Peshock
Assistant Examiner—Peter K. Skiff
Attorney, Agent, or Firm—Holman & Stern

[57] ABSTRACT

An animal trap comprising a base, a pair of generally U-shaped jaws journaled in said base for pivotal movement toward and away from each other between fully open and fully closed positions, U-spring means associated with the jaws and normally operative from a compressed to a released condition to pivot the jaws toward each other to the fully closed position and animal actuated trigger means for releasing the spring means. At least one of the jaws has a generally cylindrical elongated jamb or spacer element mounted thereon which extends toward the other jaw and abuts it in the jaws closed position to maintain the jaws at least slightly spaced apart even in the fully closed position. In one form of the invention, the jamb element includes a generally rectangular longitudinally extending slot therein which receives and is received within a generally rectangular notch in the jaw, which notch opens toward the other jaw.

13 Claims, 5 Drawing Figures

U.S. Patent  Sept. 6, 1977  4,045,905
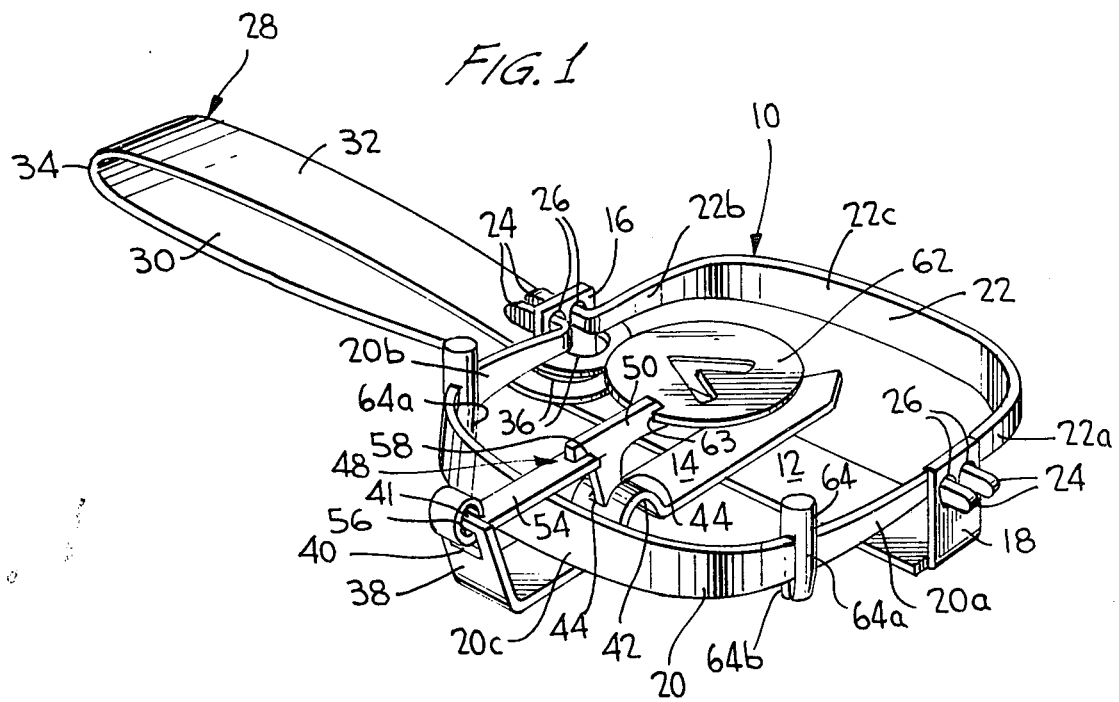
FIG. 1
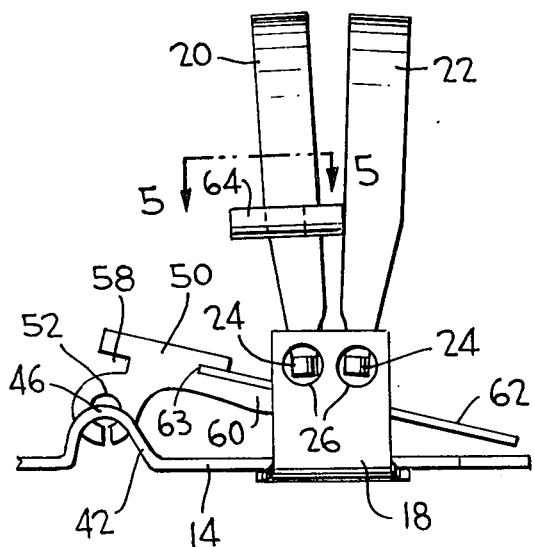
FIG. 2
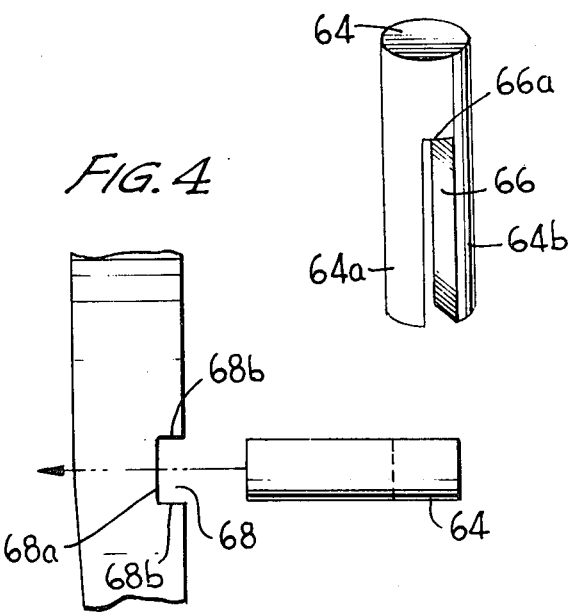
FIG. 3
FIG. 4
FIG. 5

ANIMAL TRAP

BACKGROUND OF THE INVENTION

The present invention relates to animal traps and, more particularly, to animal traps of the spring-pressed jaw type adapted for trapping small animals.

There are various types of animal traps in use by trappers for both large and small animals. These generally fall into the so-called leg-hold type and swinging frame or "Conibear" type traps. The swinging frame type traps are usually considered more humane in that they quickly and painlessly kill the animal when sprung, whereas the leg-hold type traps catch the animal by the leg but do not kill it. Furthermore, the leg-hold traps often break the animal's leg. Yet, the leg-hold traps are often preferred due to the inherent advantages they possess over the swinging frame type traps. There is, however, a need for a more humane leg-hold trap.

It is, therefore, a primary object of the present invention to provide an animal trap of the leg-hold type which is humane and free of the disadvantages of the prior art traps.

It is another object of the present invention to provide a humane animal trap of the leg-hold type which is easy and inexpensive to manufacture.

It is a further object of the present invention to provide means for rendering an animal trap of the leg-hold type more humane.

SUMMARY OF THE INVENTION

Consistant with the foregoing objects, the device of this invention is an animal actuated, small animal trap in which a pair of spring loaded jaws are held open by a keeper and are released to snap closed when a trigger mechanism is actuated by the animal, the jaws in their closed position being maintained spaced apart by a jamb member therebetween. Such a trap is more humane than conventional traps in that the jaw spacing reduces the likelihood that the bones of the trapped animal will be crushed. It is also more effective than conventional traps in that the jaw spacing precludes severing an appendage of the animal which may be between the jaws and, thereby, allowing the animal to escape.

BRIEF DESCRIPTION OF THE INVENTION

The invention will be better understood from the following description and appended claims considered together with the following drawings in which:

FIG. 1 is a perspective view of the animal trap of the present invention in the open or set position;

FIG. 2 is a side elevation of the animal trap of FIG. 1 showing the trap in tripped or closed position;

FIG. 3 is a perspective view of the jaw jamb or spacer member which maintains the jaws slightly spaced apart even after the trap is tripped;

FIG. 4 is an exploded partial elevational view of a trap jaw and jaw jamb; and

FIG. 5 is a sectional view taken substantially along line 5—5 in FIG. 2.

DESCRIPTION OF THE PREFERRED EMBODIMENT

Referring in detail to the drawings and particularly to FIG. 1, there is shown generally at 10 the animal trap of the present invention. The trap 10 is conventional in most respects, as is apparent from US PATS. Nos. 3,335,517, 2,501,928, 1,939,190, 1,356,775, 1,256,973, and 833,827, which show many of the features of trap 10 to be well known. The trap comprises a transversely elongated base plate 12 and longitudinally elongated cross plate 14 overlying and secured to base plate 12 at the central portion thereof. Base plate 12 is formed with upstanding end standards 16 and 18 on opposite ends thereof which serve as jawposts for generally similar first and second U-shaped jaws 20 and 22. Each of the jaws 20 and 22 include parallel spaced legs 20a, 20b and 22a, 22b, respectively and a cross member 20c and 22c between the parallel legs. The cross members each have an inner gripping face 23 and 25, respectively. The legs terminate in laterally outwardly pintles 24 which are individually journalled through apertures 26 in standards 16 and 18. The jaws are adapted and arranged to pivot between an open jaw position (FIG. 1) when the trap 10 is set and a closed jaw position (FIG. 2) wherein the jaws are in substantial registry and alignment when the trap has been tripped and has snapped closed.

The trap 10 in the set position is spring loaded by any conventional spring means such as generally U-shaped spring 28 which includes generally parallel straps 30 and 32 extending from the trough 34 of the U. Bores 36 are formed adjacent the free ends of each of the straps 30 and 32 to receive end standard 16 corresponding jaw legs 20b and 22b therethrough. When spring 28 is compresses, as shown in FIG. 1, end standard 16 is received within bores 36 of both straps 30 and 32 and jaw legs 20b and 22b in the horizontal position overlie upper strap 32. When trap 10 is tripped, strap 32 of spring 28 expands upwardly and acts upon jaw legs 20b and 22b to force jaw legs 20b and 22b to pivot and close toward each other and to trap the animal therebetween. In the tripped position, bore 36 of strap 30 receives end standard 16 therein and bore 36 of strap 32 receives jaw legs 20b and 22b therein.

Cross plate 14 terminates at the end thereof remote from base plate 12 in an upstanding ear 38 which has a transversely extending slot 40 formed therein adjacent its end to define between the edge of ear 30 and the slot 40 a transverse pivot bar 41. Intermediate ear 38 and base plate 10, there is formed in cross plate 14 an upwardly curved portion 42 which includes a pair of longitudinally spaced apart longitudinally extending slots 44 therein defining therebetween a transverse pivot bar 46 at the peak of curved portion 42.

A trigger mechanism 48 is pivotally mounted on pivot bars 41 and 46 and consists of a trigger 50 having an aperture 52 in the lowermost portion thereof through which pivot bar 46 passes to pivotally mount the trigger. The trigger mechanism also includes an elongated latch 54 formed with a circular opening 56 at one end which freely receives pivot bar 41. Trigger 50 is formed with a shallow notch 58 opening toward latch 54 for receiving the free end of latch 54 therein. The longitudinally opposite end of trigger 50 defines a shelf 60 on which a bait perch or pan 62 rests with a peripheral portion of pan 62 received within undercut notch 63 in trigger 50.

The trap 10 is set by depressing upper spring 32 toward lower spring stap 30 to compress spring 28 to the point that jaws 20 and 22 fall to their horizontal open position. In this position end standard 16 is received within bores 36 and the free end of upper spring strap 32 is below apertures 26. With the jaws in the horizontal position, latch 54 is pivoted to a generally horizontal position overlying cross member 20c of jaw 20 engaging notch 58 in trigger 50. The upward pressure exerted by spring 28 on the underside of jaw 20 which is, in turn, exerted by jaw 20 on the underside of latch 54 maintains the latch in position forced against the top surface of notch 58. This upward pressure is sufficient to overcome the tendency of trigger 50 to pivot away from latch 54 under the influence of the weight of pan 62 acting on shelf 60. The trap is tripped when an animal applies sufficient pressure to pan 62 to cause trigger 50 to rotate forwardly and downwardly away from latch 54 and to release the engagement of latch 54 with notch 58. This frees spring 28 to expand and upper spring strap 32 to move upwardly. As trap 32 moves upwardly it exerts an upward pressure on legs 20b and 22b of jaws 20 and 22 causing the jaws to pivot upwardly from their horizontal open position toward each other and to clamp the jaws upon and around any portion of the animal between them However, as is apparent from FIG. 2, jaws 20 and 22 are prevented from fully closing upon each other and are maintained slightly spaced by jambs or spacer 64 which are mounted on each of legs 20a and 20b of jaw 20 (FIG. 1). The precise location on the jaw or jaws and the number of jambs employed is a matter of choice and does not materially affect the function of the jambs, which is to prevent the jaws 20 and 22 from completely closing and crushing the animal's bones or severing an appendage from the animal and, thereby, permitting the animal to escape. Although two jambs 64 arranged as shown in FIG. 1 is the preferred configuration, it will be appreciated that a single jamb located on cross member 20c will perform substantially the same function in a slightly less effective manner Alternatively, more than 2 jambs may be employed, e.g. 3 jambs, one on each leg and on the cross member. Still another embodiment contemplates jamb members on each of the jaws. Thus, an equivalent embodiment to the one shown in FIG. 1 would locate one of the jambs 64 at a location on jaw 22 corresponding to its present location on jaw 20 so that each jaw carries a single jamb.

Jamb 64 is, in a preferred form, an elongated, generally cylindrical member having a longitudinally extending generally rectangular slot 66 in one end thereof. The depth of the slot may vary depending upon the dimensions of the jamb and the desired separation of the jaws. One method of mounting jamb 64 on jaw 20 is illustrated in FIG. 4. A shallow generally rectangular notch 68 is formed in jaw 20 along the edge thereof which most closely abuts jaw 22 when the trap is tripped. Notch 68 is appropriately dimensioned to accomodate the diameter of jamb 64. Likewise the width of slot 66 in jamb 64 is dimensioned to snugly receive jaw 20 therein. Jamb 64 is mounted on jaw 20 by sliding slot 66 onto the jaw with the body portions 64a and 64b of the jamb on opposite sides of the jaw, until the end wall 66a of slot 66 abuts the end wall 68a of notch 68 with sides 68b of the notch along diametrically opposite surfaces of jamb 64. If desired, body portions 64a and 64b of the jamb which extend beyond jaw 20 may be tapered toward each other to narrow the slot 66 and thereby assist in keeping jamb 64 in position on jaw 20. It will be appreciated that by adjusting the depth of slot 66 and/or notch 68, the offset or separation distance between jaws 20 and 22 when the trap is in the tripped position can be controlled.

While the present invention has been described with reference to particular embodiments thereof, it will be understood that numerous modifications can be made by those skilled in the art without actually departing from the scope of the invention, Accordingly, all modifications and equivalents may be resorted to which fall within the scope of the invention as claimed. For example, a trapper already owning a trap of the leg-hold type could mount jambs 64 on the jaws thereof, thereby rendering the trap humane and avoiding the necessity of replacing the trap with a new one.

What is claimed is:

1. In an animal trap including a base, a pair of generally U-shaped jaws, each comprising a pair of parallel spaced legs and a cross member, said cross member having an inner gripping face, said legs being journaled in said base for pivotal movement of said jaws toward and away from each other between fully open, when set, and fully closed, when sprung, positions; spring means operatively associated with said jaws and normally operative to pivot said jaws toward each other to the fully cosed position in which said cross members abut each other at the inner gripping faces; and animal actuated trigger means for releasing said spring means: the improvement comprising spacer means comprising at least one elongated spacer element mounted on at least one leg of at least one of said jaws and extending toward the corresponding leg of the other of said jaws whereby the corresponding leg of the other of said jaws abuts said spacer means when said trap is sprung to space said jaws apart a predetermined distance and prevent same from fully closing, said cross members being free of spacer means and said inner gripping faces being unimpeded by said spacer means.

2. In an animal trap including a base, a pair of generally U-shaped jaws, each comprising a pair of parallel spaced legs and a cross member, said cross member having an inner gripping face, said legs being journaled in said base for pivotal movement of said jaws toward and away from each other between fully open, when set, and fully closed, when sprung, positions; spring means operatively associated with said jaws and normally operative to pivot said jaws toward each other to the fully closed position in which said cross members abut each other at the inner gripping faces; and animal actuated trigger means for releasing said spring means: the improvement comprising spacer means comprising at least one elongated spacer element mounted on at least one leg of at least one of said jaws and extending toward the corresponding leg of the other of said jaws whereby the corresponding leg of the other of said jaws abuts said spacer means when said trap is sprung to space said jaws apart a predetermined distance and prevent same from fully closing, said inner gripping faces being unimpeded by said spacer means, said elongated spacer element including a longitudinally extending slot in one end thereof, said slot adapted to closely receive said leg therein for mounting said spacer element on said jaw.

3. An animal trap, as claimed in claim 2, further including a notch in said leg on which said spacer element is mounted, said notch opening toward said other jaw and receiving said slot in said jamb element therein.

4. An animal trap, as claimed in claim 3, wherein said notch and said slot comprise opposite generally parallel side walls and an end wall, said end walls of said notch and slot in abutting relation when said slot is received in said notch.

5. An animal trap, as claimed in claim 4, wherein a portion of each of said opposite slot side walls extend beyond said jaw when said end walls are in abutting relation.

6. An animal trap, as claimed in claim 5, wherein said portions of said slot side walls extending beyond said jaw are inclined toward each other.

7. An animal trap, as claimed in claim 4, wherein said spacer means comprises at least two spacer elements.

8. An animal trap, as claimed in claim 7, wherein said spacer elements are mounted on the legs of a single jaw.

9. In an animal trap including a base, a pair of generally U-shaped jaws journaled in said base for pivotal movement toward and away from each other between fully open and fully closed positions, spring means operatively associated with said jaws and normally operative to pivot said jaws toward each other to the fully closed position and animal actuated trigger means for releasing said spring means, the improvement comprising jamb means mounted on at least one of said jaws and extending toward the other of said jaws whereby the other of said jaws abuts said jamb means in the fully closed position to space said jaws apart a predetermined distance; said jamb means comprising at least one elongated jamb element, said elongated jamb element including a longitudinally extending slot in one end thereof, said slot adapted to closely receive said jaw therein for mounting said jamb element on said jaw, said jaw on which said jamb element is mounted having a notch opening toward said other jaw and receiving said slot in said jamb element therein, said notch and said slot comprising opposite generally parallel side walls and an end wall, said end walls of said notch and slot in abutting relation when said slot is received in said notch, said jamb element being an elongated cylinder and said slot being generally rectangular in cross-section.

10. An animal trap, as claimed in claim 9, wherein said notch is generally rectangular in cross section.

11. For use in combination with a trap of the animal actuated, leg-hold type which includes spring means normally operative upon a pair of generally U-shaped jaws for pivoting said jaws toward each other to a fully closed position, a jamb element for maintaining said jaws at least slightly spaced apart when said trap is in the fully closed position, said jamb element comprising a body having slot means for closely receiving one of said jaws therein whereby said jamb element is mounted on said jaw, said body including a portion extending from said jaw to and abutting said other jaw when said trap is in the fully closed position, said body being a generally elongated cylinder, said slot means comprising a slot formed in one end of said body, said slot being longitudinally extending and comprising opposite generally parallel side walls and an end wall, said side walls inclining toward each other at their free ends, and said portion comprising the other end of said body.--

12. For use in combination with a trap of the animal actuated, leg-hold type which includes spring means normally operative upon a pair of generally U-shaped jaws, each having a pair of legs and a cross member having an inner gripping face, for pivoting said jaws toward each other to a fully closed position when said trap is sprung, a spacer element for maintaining said jaws at least slightly spaced apart when said trap is in the sprung position without impeding said inner gripping faces, said spacer element comprising a body having slot means for closely receiving one of said jaws therein for thereby mounting said spacer element on said jaw, said body including a portion extending from said jaw to and abutting said other jaw when said trap is in the sprung position.--

13. A spacer element, as claimed in claim 12, wherein said body is generally elongated, said slot means comprises a slot formed in one end of said body, and said portion comprises the other end of said body.

* * * * *